United States Patent [19]

Jones

[11] Patent Number: 4,846,427
[45] Date of Patent: Jul. 11, 1989

[54] LAWN AND LEAF BAG FRAME

[76] Inventor: Hubert B. Jones, 7908 Brynwood Ct., Louisville, Ky. 40291

[21] Appl. No.: 148,367

[22] Filed: Jan. 20, 1988

[51] Int. Cl.⁴ ............................................. B65B 67/04
[52] U.S. Cl. ....................................... 248/95; 403/223
[58] Field of Search .................... 248/99, 95; 403/223; 474/253, 255, 256, 248, 403

[56] References Cited

U.S. PATENT DOCUMENTS

| | | | |
|---|---|---|---|
| 777,215 | 12/1904 | Meston | 403/223 |
| 1,407,341 | 2/1922 | Veeck | 403/223 |
| 1,985,427 | 12/1934 | Richardson | 403/223 |
| 3,041,026 | 6/1962 | Wilson | 248/98 |
| 3,754,771 | 8/1973 | Shagoury | 280/654 |
| 4,160,557 | 7/1979 | Taylor | 280/652 |
| 4,202,521 | 5/1980 | Harding | 248/99 X |
| 4,208,037 | 6/1980 | Le Gal | 403/223 X |
| 4,442,567 | 4/1984 | Pravettone | 248/99 X |
| 4,482,116 | 11/1984 | Vadnais | 248/99 |
| 4,548,372 | 10/1985 | Lutzker | 248/99 |
| 4,561,480 | 12/1985 | Underwood et al. | 248/99 X |
| 4,615,743 | 10/1986 | Bylenga | 248/99 X |

Primary Examiner—Charles A. Marmor
Assistant Examiner—Tamara L. Finlay
Attorney, Agent, or Firm—Maurice L. Miller, Jr.

[57] ABSTRACT

A portable, collapsible lawn and leaf bag cart is disclosed which includes a U-shaped back frame, wheels attached to and extending behind the back frame and a bag supporting platform pivotally connected to a lower end portion of the back frame which is tiltable upwardly from an extended position perpendicular to the back frame to a storage position in line with the back frame. The cart also includes a pair of arms pivotally connected on an upper end portion of the back frame for supporting a rectangularly shaped bag supporting frame thereon, which arms are tiltable downwardly from an extended position perpendicular to the back frame to a storage position between and in line with the legs of the back frame. A locking device is provided which is attached to a lower end portion of one of the legs of the back frame and which is attached by a cable to an overlying one of the bag supporting arms so that a spring biased locking pin locks the platform in its extended position when the bag supporting arms are placed in their extended position. The locking device unlocks the platform from its extended position for tilting to its storage position when the bag supporting arms are tilted downwardly toward their storage position. The arms of the bag supporting frame are open at their distal ends to permit the bag supporting frame with a bag attached to be easily loaded upon and unloaded from the cart by sliding the bag supporting frame onto and off of the arms.

4 Claims, 3 Drawing Sheets

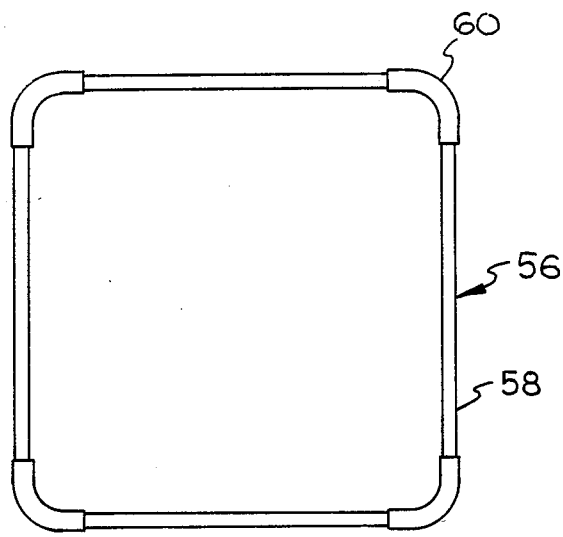
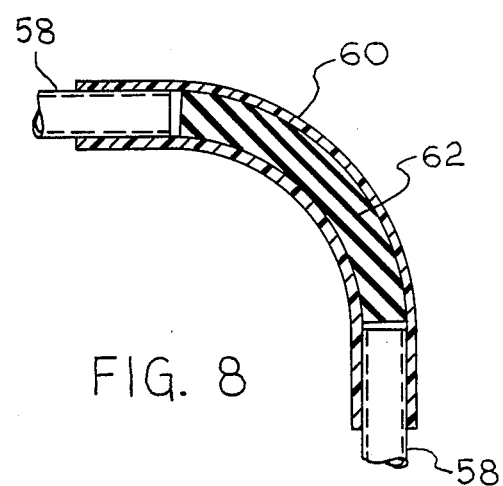
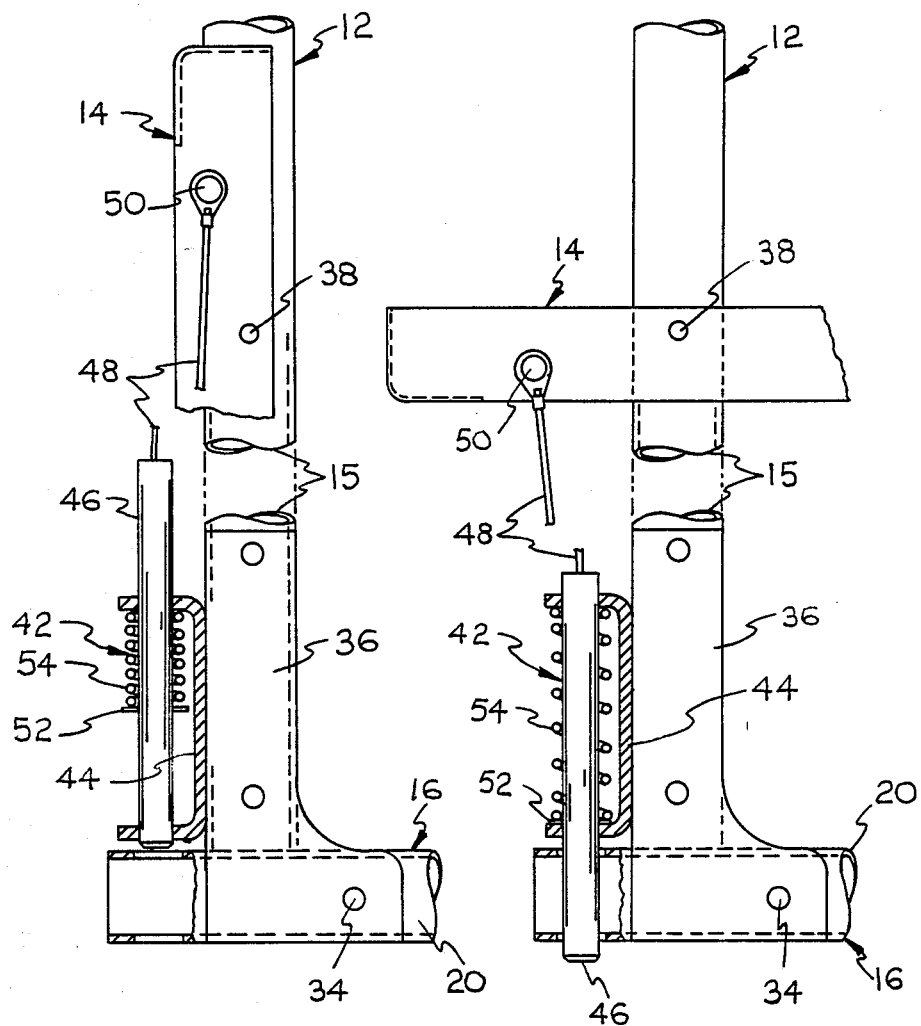

LAWN AND LEAF BAG FRAME

BACKGROUND OF THE INVENTION

This invention relates generally to lawn and leaf bag carts. More specifically, the invention relates to a portable, collapsible lawn and leaf bag cart having a flexible, resilient bag frame for supporting a lawn bag in a wide open condition and including means for locking a bag supporting platform of the cart in an extended position.

Generally speaking, collapsible carts for supporting flexible refuse bags in a wide open position are known to the prior art. See, for example, U.S. Pat. No. 4,160,557 issued to R. E. Taylor on July 10, 1979, U.S. Pat. No. 3,041,026 issued to E. F. Wilson on June 10, 1962, and U.S. Pat. No. 3,754,771 issued to P. B. Shagoury on Aug. 28, 1973.

The Wilson patent discloses such a cart having a U-shaped back frame which includes an upper bight portion which serves as a handle and a pair of parallel extending legs with wheels attached to the lower ends thereof. The reference cart also includes a foldable bag supporting platform hingably attached to the lower ends of the legs of the back frame and an upper frame, called a sack hanger, which contains sharp prongs thereon on which the mouth portion of a sack can be impaled. Obviously, care must be exercised by the user to avoid being injured by these prongs. Also the integrity of the sack impaled on the prongs is seriously diminished, especially where flexible plastic bags are used.

The Taylor patent discloses a portable, collapsible cart having a foldable bag supporting platform hingably connected to the base of a back frame and an upper bag support frame hingably connected to an upper portion of the back frame. A bag is held in an open position on the platform by means of a plurality of clamps mounted on the upper bag support frame. The clamps are permanently attached to the bag support frame by chains to prevent them from becoming misplaced.

The patent to Shagoury shows a portable, collapsible bag cart having a back frame, a bag supporting platform hingably connected to a lower end portion of the back frame and a generally circular bag frame hingably connected to an upper end portion of the back frame. A bag supported on the platform is held in an open condition by wrapping a mouth portion of the bag over and around the circular bag frame and securing the bag thereto by means of flexible metal or plastic clips.

None of these prior art bag carts is adapted to carry a flexible bag held in an open position by a removable bag frame so that the bag can be removed from the cart and used while maintaining an open position and, thereafter, be placed back on the cart after being filled. Moreover, none of these prior art bag carts employs means to positively lock the bag supporting platform in an extended position by placing the upper bag frame in a bag carrying position.

By means of my invention, these and other difficulties encountered with prior art lawn and leaf bag carts are substantially eliminated.

SUMMARY OF THE INVENTION

It is an object of my invention to provide a portable, collapsible lawn and leaf bag cart.

It is a further object of my invention to provide a lawn and leaf bag cart for carrying a flexible refuse bag in an open condition by means of a flexible, resilient bag frame.

It is also an object of my invention to provide a collapsible lawn and leaf bag cart having means for positively locking a bag supporting platform of the cart in an extended position perpendicular to the back frame.

It is yet another object of my invention to provide a portable lawn and leaf bag cart having wheels positioned behind the legs of the platform and locking means to lock the platform in an extended position located behind the back frame to permit the cart to also be used for transporting fire logs and relatively lengthy pieces of wood and branches.

Briefly, in accordance with my invention, there is provided a portable, collapsible cart for transporting a flexible refuse bag which includes a back frame having a handled portion and wheel means connected to a lower end portion of the back frame. Also included is a bag supporting platform pivotally connected to a lower end portion of the back frame for tilting upwardly from an extended position perpendicular to the back frame to a storage position extending along a portion of the length of the back frame. Also included is a bag frame supporting bracket pivotally connected to the back frame above the connection of the platform to the back frame such that the bracket is tiltable downwardly from an extended position perpendicular to the back frame to a storage position along a portion of the length of the back frame. Lastly, there is provided means for locking the platform in its extended position by placement of the bracket in its extended position and for unlocking the platform by movement of the bracket toward its storage position.

These and other objects, features and advantages of my invention will become apparent to those skilled in the art from the following detailed description and attached drawings upon which, by way of example, only a single preferred embodiment of my invention is explained and shown.

BRIEF DESCRIPTION OF THE DRAWINGS

FIG. 5 shows a fragmented side elevation view, looking from the inside outwardly, of a portion of the cart of FIGS. 1-4 illustrating a base locking mechanism in an unlocked condition.

FIG. 6 shows a fragmented side elevation view, the same as in FIG. 5, of a portion of the cart of FIGS. 1-4 illustrating a locked condition of the base locking mechanism.

FIG. 7 shows a plan view of a lawn and leaf bag frame for use on the cart of FIGS. 1-4.

FIG. 8 shows a cross-sectional fragment of the bag frame of FIG. 7.

DESCRIPTION OF THE PREFERRED EMBODIMENT

Figure 1:
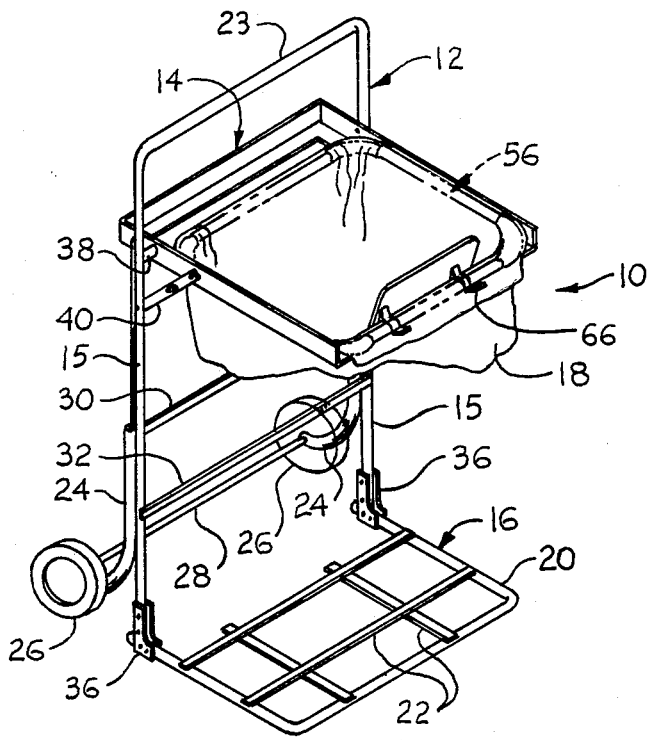
FIGS. 1 and 2 show frontal and rearward perspective views, respectively, of a lawn and leaf bag cart, thus illustrating one preferred embodiment of my invention.

Referring now to the drawing figures, there is shown, in one preferred embodiment of my invention, a lawn and leaf bag cart 10 which includes an inverted U-shaped back frame 12, a bag frame support bracket 14 pivotally connected to upper end portions of a pair of legs 15 of the frame 12, and a base 16 pivotally connected to lower end portions of a pair of legs 15 to form a supporting platform for a bag 18. The base or platform 16 includes a U-shaped member 20 and rigid, flat braces 22 affixed thereto and to one another in criss-cross fashion to form a suitable bag supporting surface. The U-shaped back frame 12 and member 20 may be made of any suitable, rigid material such as, for example, plastic or metal tubing. A central or bight portion of the back frame 12 serves as a convenient handle 23. A pair of tubular legs 24, having linear upper end portions and curved lower end portions, is attached in a suitable manner, as by bolts or other fastening means, to lower portions of the legs 15 to provide legs for a pair of wheels 26 which project rearwardly of the lower end of the back frame 12. The wheels 26 are held in a spaced alignment by means of a rod 28. Upper end portions of the legs 24 are braced by a cross member 30 and lower end portions of the legs 15 are braced by a cross member 32.

Figure 2:
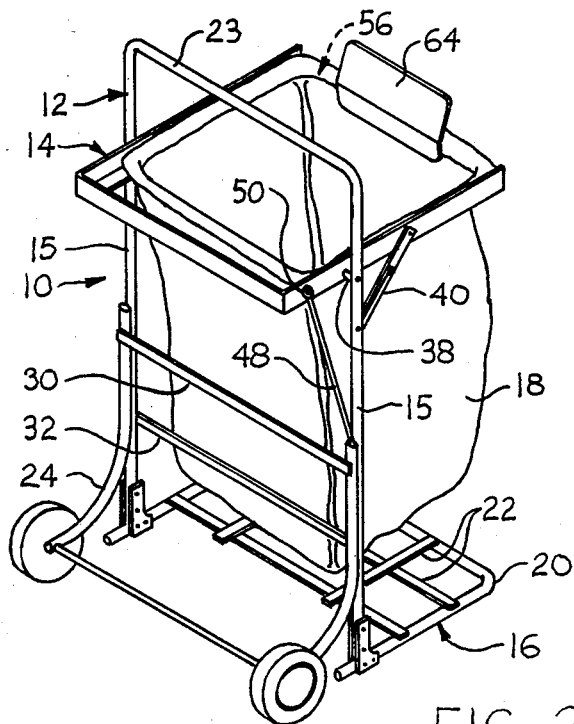
Figure 3:
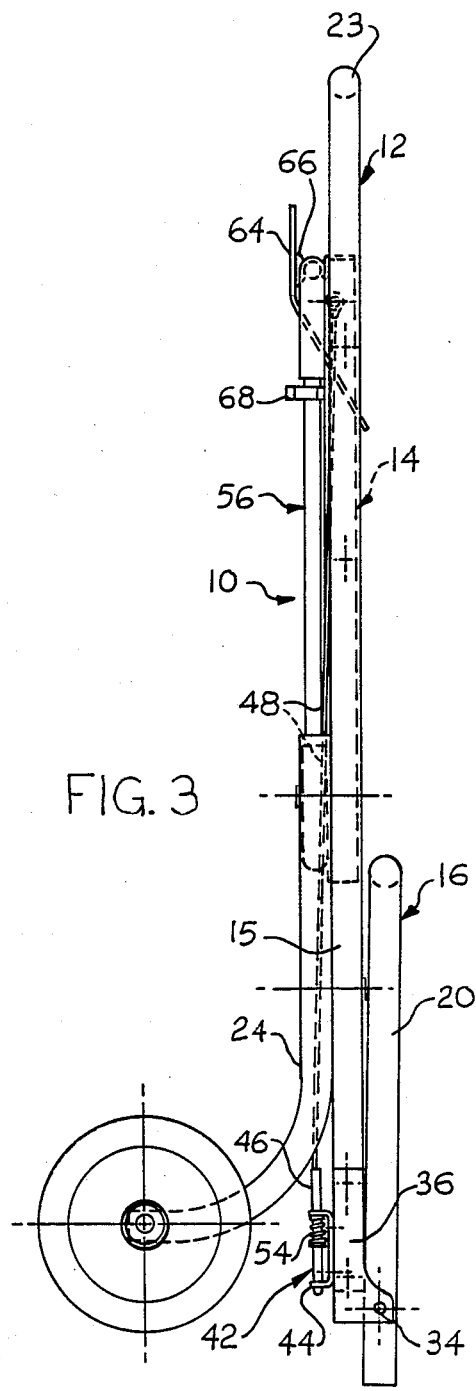
FIG. 3 shows a side elevation view of the lawn and leaf bag cart of FIGS. 1-2 with portions thereof being placed in a storage condition.
Figure 4:
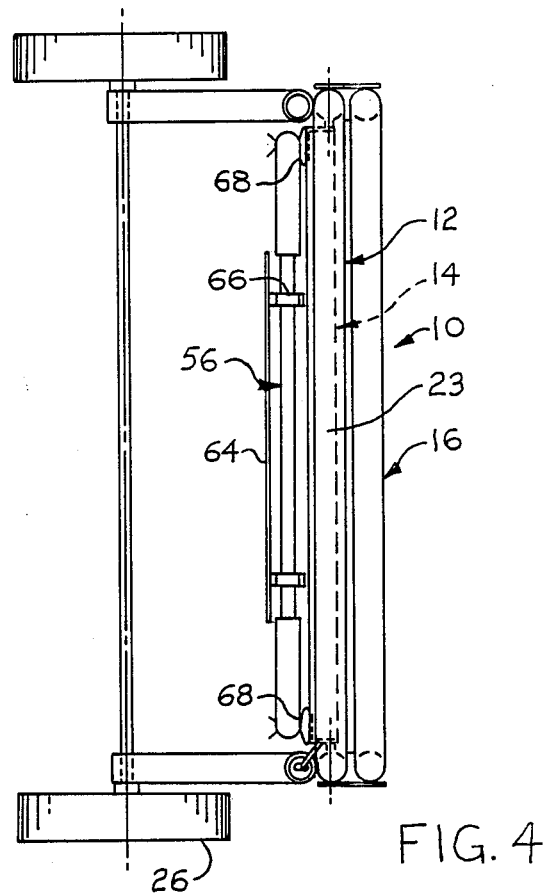
FIG. 4 shows a plan view of the cart of FIG. 3 with portions thereof being placed in a storage condition.
Figure 10:
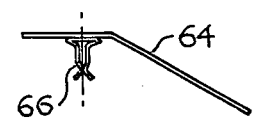
FIG. 10-11 show edge and plan views, respectively, of a leaf or dust pan for use with the frame of FIGS. 7-9.
Figure 11:
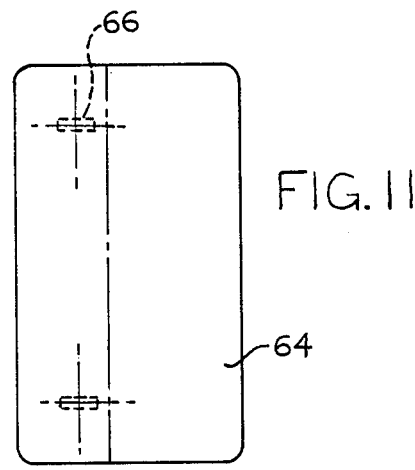

End portions of the arms of the base member 20 are pivotally connected by means of pivot pins 34 to L-shaped brackets 36 which are, in turn, secured to lower end portions of the legs 15 of the back frame 12. As shown most clearly shown in FIGS. 5-6, end portions of the arms of the member 20 fit against the lower ends of the legs 15 when in an extended position so that the lower ends of the legs 15 act as stops to prevent the base 16 from tilting downwardly beyond a right angle with respect to the back frame 12. The base 16 is, therefore, tiltable upwardly from its extended position as shown in FIGS. 1-2 and 5-6 to a storage position against the back frame 12 as shown in FIGS. 3-4.

The bag frame support bracket 14 is also U-shaped and can be made of any suitable material wherein the arms thereof have right angle cross-sections. The bracket 14 is pivotaly connected by means of a pair of pins 38 to an upper end portion of the legs 15 so that it may be tilted from an extended position perpendicular to the back frame 12 as shown in FIGS. 1-2 and 6 downwardly to a storage position in the plane of the back frame 12 between the legs 15 as shown in FIGS. 3-5. A single breakable or foldable brace 40 of conventional type, located on one side of back frame 12 and connected between a leg 15 and an arm of the bracket 14 on the same side, supports the bracket 14 in its extended position. The brace 40 may be broken or released by hand in the usual, well known manner to permit the bracket 14 to be tilted downwardly to the storage position.

A locking device 42 is provided having a U-shaped bracket 44 connected to a lower portion of one of the legs 15 just above the end of one of the arms of the member 20 (See FIGS. 5-6). A vertically movable locking pin 46 extends through a pair of aligned holes in the upper and lower surfaces of the bracket 44 and can be inserted through aligned holes in an end portion of one arm of the member 20 when the base is in its extended positions as shown in FIG. 6. The pin 46 is connected by means of a flexible cable 48 to a pin 50 located on the overhanging arm of the bracket 14. The cable 48 extends from the pin 46 upwardly through a hole in one of the legs 24 and upwardly out of the upper end of the linear portion of the latter to the pin 50. The pin 50 is located rearward of the pivot pin 38 when the bracket 14 is ex-tended so that, as the bracket 16 is tilted downwardly to its storage position, the pin 50 rotates upwardly through a vertical arc to pull the pin 46 upwardly out of the one leg of the member 20 to permit the base to be folded upwardly to its storage position. The locking pin 46 is maintained within the bracket 44 by means of a pin 52. A coiled spring 54 encircles the pin 46 and is confined between an upper surface of the bracket 44 and the pin 52. When the bracket 14 is in its storage position as shown in FIGS. 3 and 5, the cable 48 is taunt and holds the locking pin 46 in a raised position out of engagement with the member 20 so that the latter may be freely tilted to the storage position. When putting the cart 10 into use, the base 16 is first tilted downardly from the storage position to the extended position, after which the bag support bracket 14 is tilted upwardly to its extended position. The latter action causes the pin 50 to drop through a vertical arc to allow the cable 48 to loosen to permit the spring 54 to expand and force the pin 46 downwardly into locking engagement with the member 20. The spring 54, which is compressed when the bracket 14 is in the storage position as shown in FIG. 5, forces the pin 46 into engagement with the member 20 when the bracket 14 is tilted upwardly to its extended position as shown in FIG. 6 and holds the pin 46 in such engagement until the bracket 14 is again tilted to the storage position. The cable 48 is thus taunt and holds the spring 54 in a compressed state at all times while the bracket 14 is stored and is relatively tensionless at all times while the bracket 14 is extended, whereby, while in the latter condition, the spring 54 is fully expanded within the bracket 44 to maintain the pin 46 in locking engagement with the member 20.

Figure 9:
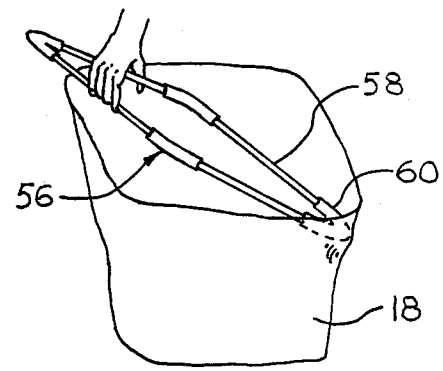
FIG. 9 shows a plan view of the bag frame of FIG. 7 illustrating how it may be bent by hand in order to insert it within the opening of a bag.

The angled cross-section of the bracket 14 permits a rectangularly shaped bag frame 56 (See FIG. 7) to rest on the horizontally extending ledges thereof when the bracket 14 is extended as shown in FIGS. 1-2. The frame 56 includes four relatively rigid tubular elements 58 connected together by four sections 60 of flexible, resilient hose such as ordinary flexible rubber or plastic garden hose, for example. A flexible, resilient tubular shaped plug or insert 62, which may be made of rubber or plastic, is placed in the center of each of the sections 60 to prevent crimping of the sections 60 when bent. As shown in FIG. 8, the ends of adjacent elements 58 are inserted into opposite ends of each hose section 60 and should be of sufficient diameter to form a secure friction fit. The frame 56 may thus be bent relatively easily by hand at the flexible sections 60 as shown in FIG. 9 for placement within the opening of the bag 18 after which the frame 56 is allowed to expand back to its rectangular shape to hold the bag 18 in an open condition. The elements 58 may be somewhat flexible so as not to be easily bent permanently out of shape when the frame 56 is collapsed but should be rigid enough to maintain the desired rectangular shape of the frame 56 when in use to hold the bag 18 open and support an upper portion thereof above the platform 16. The rim of the bag 18 can easily be wrapped around the tubular elements 58 so as to secure the bag 18 in an open condition when the frame 56 is slid onto the supporting ledges of the bracket 14.

In the alternative, the frame 56 can readily be squeezed partially closed by hand as shown in FIG. 9 while the edge of the bag 18 is brought up through the frame 56 and wrapped over and around the elements 58 and sections 60. The frame 56 is then allowed to expand back to its rectangular shape after which, the frame 56, with the bag 18 attached, can be placed on the horizontal ledges of the arms of the bracket 14 with the edges of the now open bag 18 lying securely between the frame 56 and the ledges. The arms of the bracket 14 are open at their distal ends to facilitate the sliding of the bag supporting frame 56, with the bag 18 attached, onto and off of the arms.

An additional feature of my invention is a dust pan 64 shown in FIGS. 1-4 and 10-11. The pan 64 is bent slightly as shown best in FIG. 10 to facilitate the sweeping of dirt, dust and trash thereover into the mouth of the bag 18. The pan 64 includes a pair of conventional spring clips 66 attached to the underside thereof which permit the pan 64 to be removably and pivotally attached to any one of the four elements 58 of the bag frame 56. An additional pair of spring clips 68 (See FIGS. 3-4) are connected opposite one another on the back of the arms 15 to permit the bag frame 56 to be hung therefrom in a stored condition. The bag 18 is easily removed from the bracket 14 by taking hold of the frame 56 and sliding the same forwardly away from the back frame 12. To fill the bag 18 with leaves or grass, it is only necessary to stand the frame 56 on the ground and, while holding the frame 56 in a vertical plane with one hand, rake or scoop grass, leaves and twigs into the open mouth of the bag 18 with the other hand. Upon filling the bag 18, the same can be lifted by the frame 56 and placed on the cart 10 by sliding the frame 56 into and along the bracket 14.

Those skilled in the art will appreciate that numerous variations in the details of construction of the apparatus presented in this example suggest themselves and may be made without departing from the spirit of my invention. Although the present invention has been explained with reference to specific details of a certain preferred embodiment thereof, it is not intended that such details limit the scope of my invention otherwise than as specifically set forth in the following claims.

I claim:

1. A bag frame for maintaining the mouth of a lawn bag in a wide open position comprising a series of at least three elongated and relatively rigid tubular shaped elements, a series of at least three resilient flexible, tubular shaped sections connected between adjacent end portions of said elements, and an elongated flexible, resilient tubular shaped plug disposed in a central portion of each of said sections, each said plug being capable of resiliently bending with said sections through an angle greater than the angle between said adjacent end portions when said frame is in a normal, uncompressed state for permitting said frame to be compressed by hand for insertion into the mouth of a bag and for preventing crimping of said sections when bent.

2. The bag frame of claim 1 wherein said series of elements is four.

3. The bag frame of claims 1 or 2 wherein said sections are formed of a material selected from the group consisting of rubber and plastic.

4. The bag frame of claims 1 or 2 wherein each said plug is constructed of a material selected from the group consisting of rubber and plastic.

* * * * *